United States Patent [19]
Levien

[11] Patent Number: 5,307,181
[45] Date of Patent: Apr. 26, 1994

[54] SCREEN GENERATION FOR HALFTONE SCREENING OF IMAGES USING SCAN LINE SEGMENTS OF OVERSIZED SCREEN SCAN LINES

[76] Inventor: Raphael L. Levien, P.O. Box 31, McDowell, Va. 24458

[21] Appl. No.: 768,135

[22] Filed: Sep. 27, 1991

Related U.S. Application Data

[63] Continuation-in-part of Ser. No. 753,893, Sep. 3, 1991.

[51] Int. Cl.$^5$ ............................................. H04N 1/40
[52] U.S. Cl. ..................... 358/456; 358/458; 358/465; 358/466; 358/534; 358/536
[58] Field of Search ............... 358/400, 401, 429, 452, 358/455, 456, 457, 458, 465, 466, 500, 534, 536, 296, 298, 451; 101/211; H04N 1/40

[56] References Cited

U.S. PATENT DOCUMENTS

| | | | |
|---|---|---|---|
| 3,657,472 | 4/1972 | Taudt et al. | 358/500 |
| 4,149,194 | 4/1979 | Holladay | 359/460 |
| 4,185,304 | 1/1980 | Holladay | 358/459 |
| 4,413,286 | 11/1983 | Boston | 358/460 |
| 4,456,924 | 6/1984 | Rosenfeld | 358/536 |
| 4,499,489 | 2/1985 | Gall et al. | 358/536 |
| 5,067,025 | 11/1991 | Kitagawa | 358/458 |

FOREIGN PATENT DOCUMENTS

| | | | |
|---|---|---|---|
| 0303190 | 2/1989 | European Pat. Off. | H04N 1/40 |
| 0427380 | 5/1991 | European Pat. Off. | H04N 1/40 |
| 0493935 | 7/1992 | European Pat. Off. | H04N 1/40 |

Primary Examiner—Edward L. Coles, Sr.
Assistant Examiner—Jerome Grant, II
Attorney, Agent, or Firm—Allan Jacobson

[57] ABSTRACT

A halftone screen pattern generation system for computing halftone screened images with rotated screens including multiple angle and ruling combinations, including irrational tangent angles, is disclosed. A screen pattern is generated by storing an oversized strip from an ideal angled screen pattern, and then assembling a sequence comprising selected scan line segments of the oversized strip. Each selected scan line segment corresponds to one of a plurality of offsets of the oversized strip. The error between the actual generated screen and ideal desired screen is computed. Each subsequent scan line segment is selected from the plurality of scan line segments corresponding to the plurality of offsets so as to minimize the accumulated error. In accordance with one aspect of the present invention, the measure of error between the actual generated screen and the ideal angled screen is the length of a vector in a transformed UV space between the actual screen sample point and the ideal screen sample point. The error is determined by vector addition of the accumulated error, from scan line to scan line, which is added to the present error contribution from the offset of the present scan line.

26 Claims, 7 Drawing Sheets

SCREEN GENERATION FOR HALFTONE SCREENING OF IMAGES USING SCAN LINE SEGMENTS OF OVERSIZED SCREEN SCAN LINES

This is continuation in part application of U.S. patent application entitled, "SCREEN GENERATION FOR HALFTONE SCREENING OF IMAGES", Ser. No. 753,893, filed Sep. 3, 1991.

FIELD OF THE INVENTION

This invention relates to the halftoning of photographic images using screen patterns, and more specifically to the generation of screen patterns with precisely controlled angles and rulings.

BACKGROUND OF THE INVENTION

In the above cited copending patent application by the present inventor, a method and apparatus for halftone screening of images using concatenated strips of an ideal angled screen pattern to form the scan lines of a desired screen is described. The present application relates to an improved method and apparatus for halftone screening of images, which is particularly useful for high speed implementation in hardware. A general background of halftone image screening is set forth below.

Images are typically stored in a memory representing tone values for each pixel of the original image. For a black and white image, the stored pixels represent the gray scale value corresponding to each pixel. For a color image, each color plane is stored as an array of pixels each representing the tone value for each pixel of the image in each respective color plane. For example, if each of the pixels of a black and white image is represented by a 8 bit digital word, then the tone value for a given image pixel may be one of 256 values between the black level and the white level.

Continuous tone images do not print well on most printing devices where typically the absence or presence of the ink on the paper is used to represent the printed image. In order to represent halftones (shades between the presence or absence of the printed ink), the original image is screened to produce a pattern, such as variable size dots which appear to the human eye as a halftone image.

In order to prepare a photograph for printing, it is first necessary to perform the step of halftone screening, which converts the continuous gray shades of the original into dots of varying size and shape. Typically, these dots are arranged on a regular grid of approximately 100 dots per inch. This spatial frequency is known as the screen ruling. Thus, one square inch of the final printed photograph will be composed of approximately 10,000 dots.

Screening to produce halftone images is well known. The screen consists of an array of dots, or halftone cells, each of which represents one section of continuous tone in the original image as a single dot of variable size and shape. A halftone cell, in turn, consists of an array of smaller screen pixels, or samples, each having individual values against which the input pixels derived from the original image will be compared. The individual values of the smaller screen pixels, or samples, of the repeating halftone cell which form the variable dots is referred to herein as a spot function.

The halftone screening step consists of a screen pattern generating step, and a comparison step between the input image and the screen pattern. The screen is usually stored as a fairly small pattern that repeats itself or is repeatedly generated by programming. At any point where the original image is greater than the screen pattern, the output is marked. At any point where the image is not greater than the screen pattern, the output is not marked. In other words, if the value of the image pixel is greater than corresponding value of the screen cell, a mark is generated by the marking engine, whereas if the value of the image pixel is less or equal to the screen cell value, then no mark is generated by the marking engine, or vice versa. In this way, the final screened image, composed of dots, is produced.

In color printing, there are four separate steps of halftone screening, one each for the cyan, magenta, yellow, and black inks. It is advantageous to angle the halftone grid differently for each of the four planes. For example, the most common practice is to angle the cyan dots by 15 degrees, magenta by 75 degrees, yellow by 0 (or 90) degrees, and black by 45 degrees. If these angles are adhered to precisely, as well as the screen ruling being precisely identical for all four planes, then optimum results are achieved.

Precise screen angles can be achieved quite easily in photomechanical systems by simply rotating the photographic screen carrier. However, when the image is processed electronically, and the screened image is to be produced by a digital raster scan recording device, the problem becomes much more difficult. Rational numbers, which can be represented as the ratio of two integers, are relatively easy to accurately represent in a digital computer. Irrational numbers, which cannot be represented as the ratio of two integers, are much more difficult to accurately represent in a digital image processing device or digital computer. The tangent of a 15 or 75 degree angle is an irrational number. Therefore, screens of 15 and 75 degrees can be expected to be difficult to generate in a digital device. Also, irrational screen rulings where the number of pixels per screen cell is not a rational number can be expected to be difficult to accurately reproduce in a digital image processing device.

Prior art techniques fall into two classes. In the first class, the angles can be approximated, but not achieved precisely. These techniques are known as rational tangent angle techniques, because the screen angles are limited to arctangents of rational numbers. As a result of the inaccuracy of the screens angles and rulings, objectionable moire patterns result. A method exemplary of this technique is taught in 4,149,194 (Holladay). The screen pattern is represented by a strip of pixels. To generate the screen pattern, this strip is repeated across the width of the image. To angle the screen pattern, this strip is shifted by a certain number of pixels each scan line. An advantage of this technique is that it is very fast. Another advantage is the relatively modest memory requirement for the screen.

In the second class of screen generating techniques, precise angles and rulings can be achieved, but only at the cost of a large amount of computation for each pixel. This technique is described in U.S. Pat. Nos. 4,499,489 (Gall) and 4,350,996 (Rosenfeld). The device coordinate system is represented by XY space, and a halftone cell in the screen to be printed is represented by a vector in UV space, i.e. the coordinate system of the rotated screen. For each pixel, the position of the pixel in XY space is transformed into UV space. The screen pattern for that point can be determined by applying the spot function to the UV coordinates.

Although Gall and Rosenfeld describe certain speed optimizations, the disclosed technique requires many more operations per pixel than do rational angle techniques, and therefore the hardware implementation is more complex. Another technique for generating accurate screen angles is described in European Patent 0 427 380 A2 (Schiller). The Schiller patent describes a rational tangent angle method that can achieve fairly accurate screens at the cost of requiring a substantial amount of memory, typically on the order of hundreds of thousands of words.

The present invention uses a novel technique which has the simple hardware requirements of a rational tangent method yet produces halftone screens with the precision of irrational angles. The present invention provides a method for implementing a halftone screen pattern generation system for rotated screens including multiple angle and ruling combinations, and to produce a screened image formed with a rotated screen on a digital raster output device. In addition, the present invention provides a method of computing halftone screened images that can be implemented simply as a hardware circuit as well as a computer program.

SUMMARY OF THE INVENTION

In the copending patent application referred to above, a desired halftone screen is generated by starting with a plurality of strips of an ideal angled screen pattern. In general, each strip is less than one scan line. Using the generally shorter strips, each scan line of the desired halftone screen is assembled by concatenating said plurality of strips in an order which is determined by error vector calculations. Thus, a plurality of error calculations are required, one calculation at the end of each strip, and before the beginning of the next strip, in order to assemble a single scan line of the desired halftone screen. The present invention avoids the need to perform repeated error calculations along a single scan line of the desired halftone screen.

The method of the present invention can be practiced in a system including a scanner, an image processing device, and a raster scan output device. An original image is optoelectronically scanned and stored in memory. The image to be reproduced is divided into picture elements, or pixels, of a size suitable for halftone reproduction. On reproduction, each halftone dot is printed as a combination of smaller picture elements.

A halftone screened image is produced by (a) retrieving the pixel of the stored image pixel that corresponds to the present output pixel, (b) generating one pixel of the screen pattern, (c) comparing the image pixel and screen pixel, and (d) marking or not marking the output pixel on the basis of which was greater. The process is repeated for every output pixel. The sequence of output pixels is a raster scan, i.e. one horizontal scan line sequence of pixels followed by another horizontal scan line of pixels, which is the standard sequence for most image processing systems. The key problem solved by the present invention is to accurately generate the screen pixels in raster scan sequence with a minimum of computational effort.

In accordance with the present invention, a screen pattern is generated by storing an oversized strip from an ideal angled screen pattern, which oversized strip is longer than the width of the desired halftone screen, i.e. is oversized relative to the length of one scan line of the desired halftone screen. For example, an image width may be 50,000 pixels, while the oversized strip may be 60,000 pixels long by 1 pixel high. The scan lines of the desired screen pattern are created by selecting sections, i.e. segments of the long strip equal to the width of the screen scan line. In other words, the oversized strip is offset by a different amount for each scan line such that the selected scan line segment coincides with the beginning of the scan line of the desired screen. Pixel values in the oversized strip that occur before the beginning of, or after the end of, the selected scan line segment are not used in that scan line, and are discarded for that current scan line.

The complete desired screen is generated by assembling selected scan line segments. To begin, a predetermined first scan line segment is chosen. At the end of the first scan line segment, the error between the actual screen and the ideal desired screen pattern is computed. The next scan line segment is chosen from the oversized strip so as to minimize the accumulated error. At the end of the second selected scan line segment, the error between the actual screen and the ideal desired screen is again computed, and a next selected scan line segment selected so as to minimize the accumulated error, and so on until the entire desired screen is generated.

Thus, error calculations are not required during each selected scan line segment, which results in higher screen speed. Particularly, when implemented in hardware, very fast screening speeds may be achieved. In between selected scan line segments, error calculations may be performed in software. Since error calculations occur only once per scan line, software implementation of the error calculation does not unduly burden overall screening speed.

In accordance with a preferred embodiment of the present invention, the oversized strip is a section of an ideal angled screen pattern, twice as long as the desired scan line (i.e. is twice the maximum image width). Then, for each scan line, the oversized strip is offset to the left by an amount not exceeding the length of one scan line, thereby ensuring that the offset strip always covers the scan line.

At the beginning of each scan line, a starting point is determined within the oversized strip. (The first line usually begins with the first pixel of the oversized strip). Then, screen pattern values are read out in sequence until the end of the scan line is reached. This process is repeated for all scan lines.

The new starting point for each scan line is selected so as to minimize accumulated error in generating the ideal desired screen. In order to minimize the number of oversized strip offsets which must be examined for minimum error, 16 possible points are predetermined as 16 possible starting points.

The selection of the 1 of 16 starting points is made so as to ensure that the resulting screen pattern is precisely the desired angle and ruling. This can be described in terms of making each selection so as to minimize the deviation from the ideal, also known as error.

In accordance with another aspect of the present invention, the measure of error is the length of a vector in a transformed UV space between the actual screen sample point and the ideal screen sample point. The error arises because the oversize strip has a limited length. Although the first scan line segment may be chosen to have no error, for each subsequent scan line segment the error is non-zero. Thereafter, the error is determined by vector addition of the accumulated error, from scan line to scan line, which is added to the present error contribution from the present scan line.

DETAILED DESCRIPTION OF THE INVENTION

Figure 1:
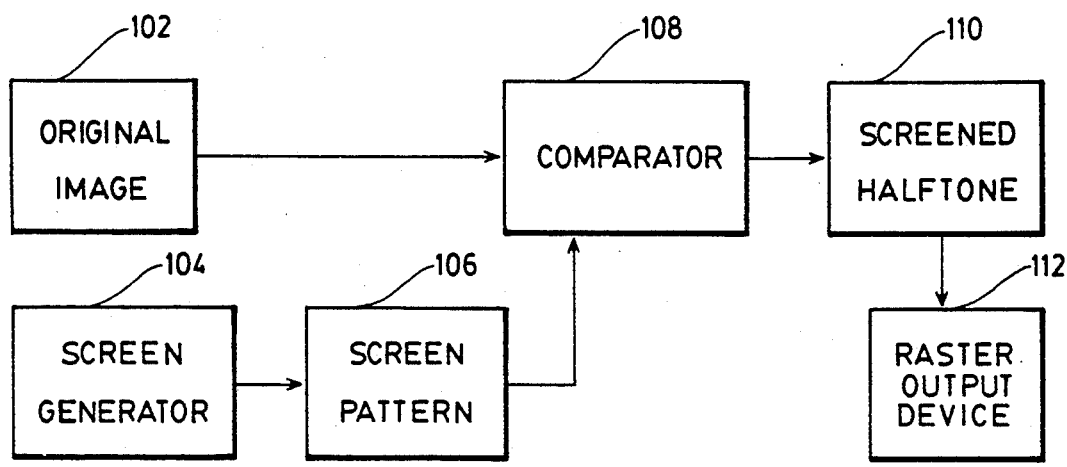
FIG. 1 shows a block diagram of a halftoning system utilizing the present invention.

The purpose of the present invention is to produce screened halftones from original images. Referring to FIG. 1, an original image source 102 is photomechanically scanned or otherwise prepared for reproduction in digital form, at which point it is presented to digital comparator 108. Although screening is described as a comparison operation between an input image and a screen pattern, it is to be understood that other operations between an input image and a screen pattern, such as multiplication, also qualify as a "screening" operation.

A screen generator 104 produces screen pattern 106, which is also presented to comparator 108. Both the original image 102 and the screen pattern 106 are composed of tiny sub-areal regions known as pixels, each of which represents a single gray shade.

Comparator 108 performs a pixel-by-pixel comparison of the original image 102 and the screen pattern 106. At pixel locations where the pixel from original image 102 is greater (i.e. a darker shade of gray) than the corresponding pixel from the screen pattern 106, the corresponding pixel in the screened halftone 110 is marked. At all other pixel locations, the screened halftone 110 is not marked, or alternatively, is marked a different way or with a different color.

The resulting screened halftone 110 is composed of dots of varying size and shape, each of which is composed of a number of pixels. Screened halftone 110 is then conveyed to raster output device 112, at which point it is recorded on photographic film or other image forming means.

Figure 2:
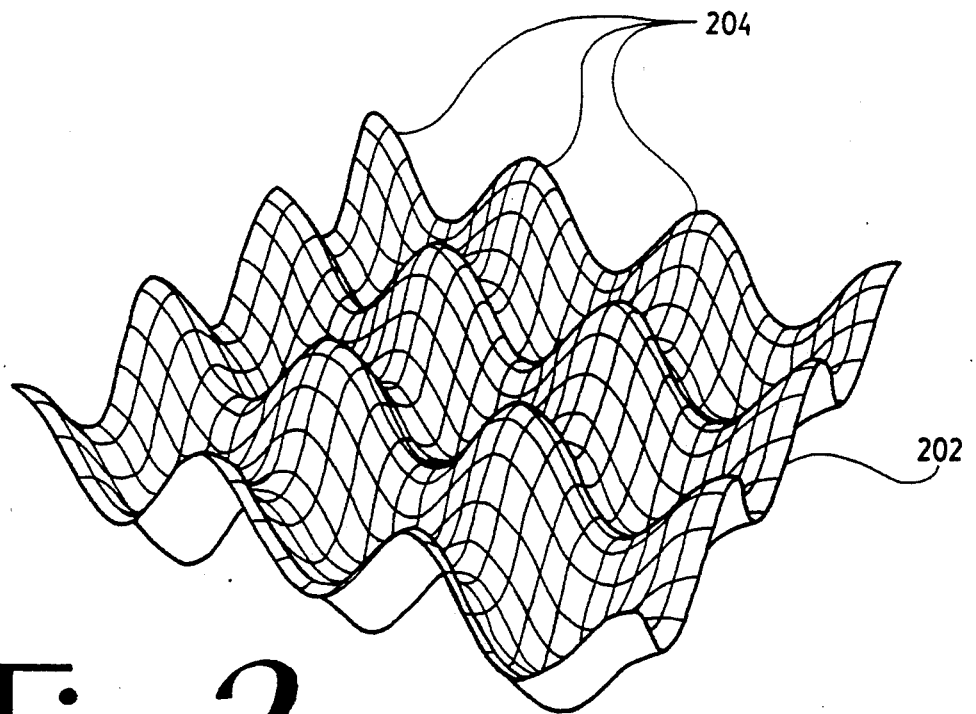
FIG. 2 shows the screen pattern as a three dimensional plot which may be used in conjunction with the present invention.

FIG. 2 shows a section of screen pattern 106 depicted as a surface in three dimensions. The grid squares represent individual screen pixels, while the height of each grid square represents the gray shade of the screen pattern at that pixel. Peak 204 represents a maximum gray shade; between peaks 204 are minimums representing minimum gray shades. A section through the surface in FIG. 2 will depict the spot function, which is roughly illustrated as a sine wave in the figure.

Figure 3:
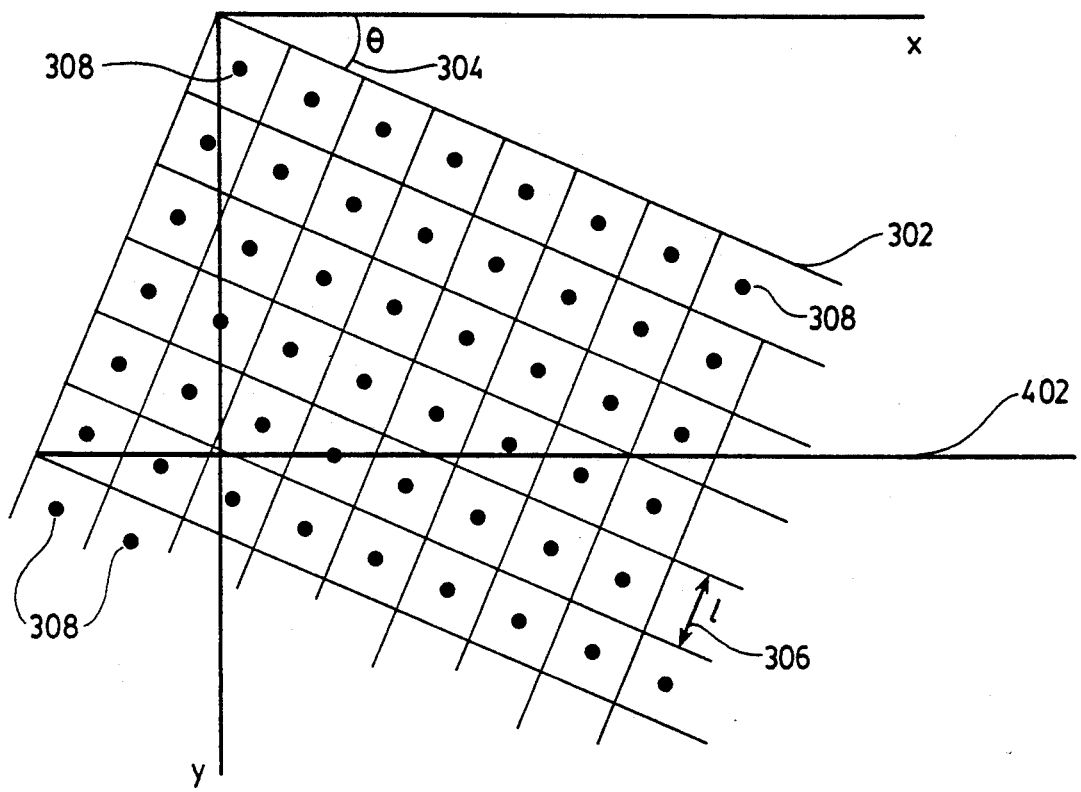
FIG. 3 shows the relation of the screen grid and the strip to the output device coordinates in accordance with the present invention.
Figures 4A, 4B:
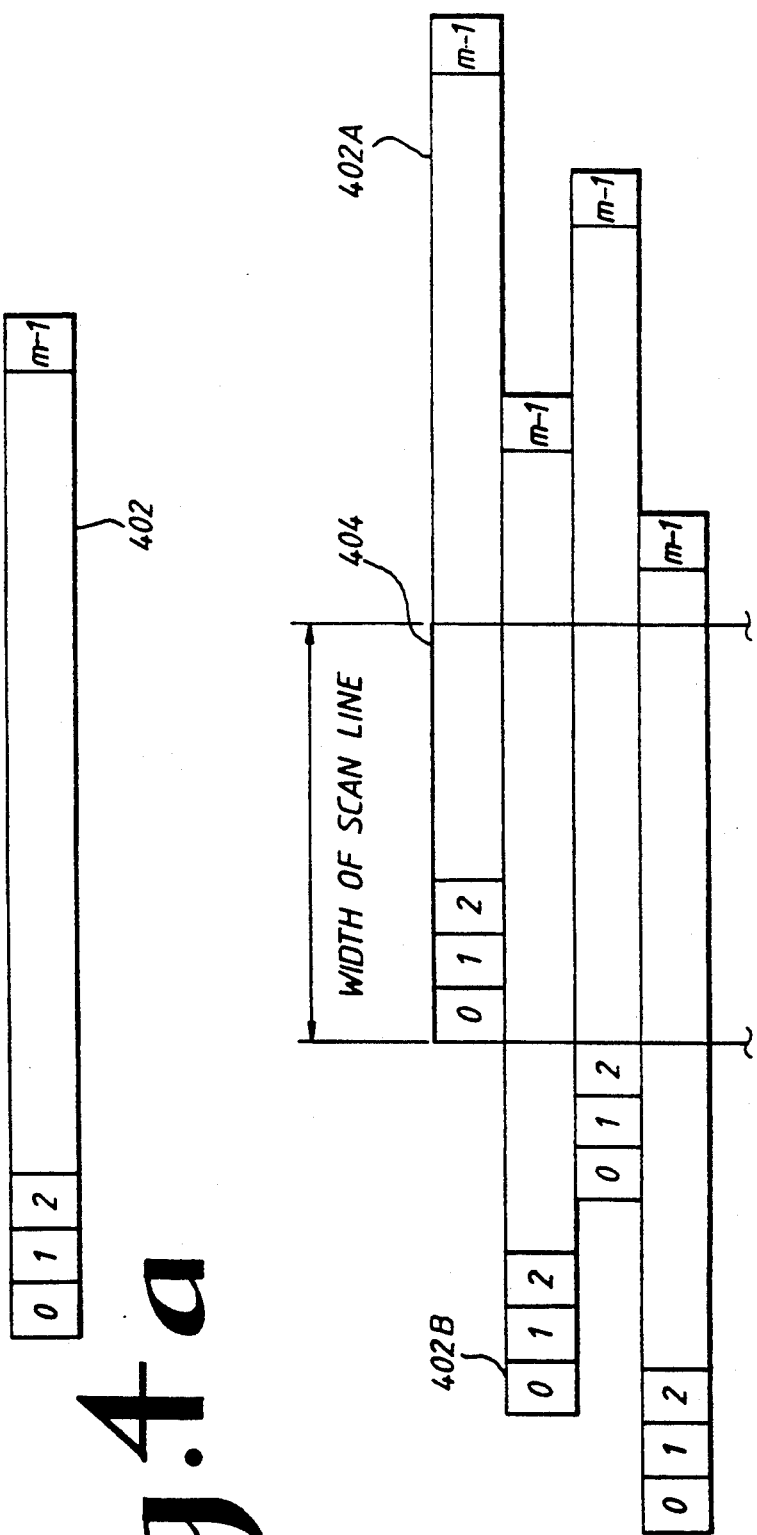
FIG. 4a shows an oversized strip of and ideal angled screen pattern used to practice the present invention.
FIG. 4b shows a resulting screen pattern composed of selected scan line segments of said oversized strip in accordance with the present invention.

FIG. 3 shows a representation of screen pattern 106. Dots 308 represent peaks of the screen pattern, corresponding to peaks 204. Such dots are positioned according to grid 302, which is rotated by angle 304 from the coordinate axes, and with spacing 306. The inverse of spacing 306 is the screen ruling of screen pattern 106. In general, spacing 306 and the tangent of angle 304 may be rational or irrational numbers. The present invention utilizes an oversized strip, i.e. strip 402, one pixel high and m pixels long, taken from an ideal angled screen. Oversized strip 402 is shown in FIG. 4a. Specifically, oversized strip 402 is composed of m pixels, numbered from 0 to m-1, where m is typically twice the maximum number of pixels in a scan line. Each pixel represents a gray shade value, corresponding to a pixel of the screen pattern.

FIG. 4b shows how screen pattern 106 is composed of multiple scan line segments selected from oversized strip 402. Each scan line of screen pattern 106 consists of a portion of strip 402 that has been selected by choosing an offset relative to the beginning of the scan line, the offset generally being different for each scan line. Values of strip 402 which fall outside scan line 404, either before or after, are not used. Specifically, the first selected scan line segment is obtained by a 0 offset shown by the position 402A of the oversized strip 402 in FIG. 4b. The next position 402B of the oversized strip 402 is offset by a selected amount relative to the start of the image scan line 404.

Figure 5:
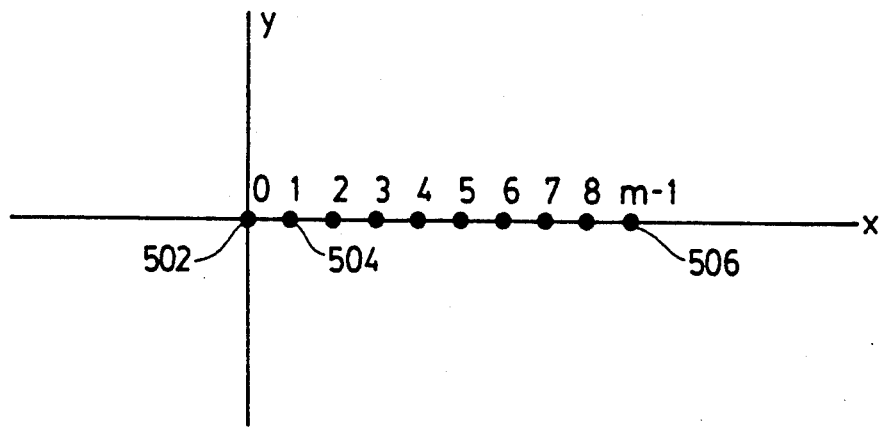
FIG. 5 shows a sequence of points (0,0) through (m-1,0) in XY space used to calculate the error function in accordance with the present invention.

The oversized strip 402 is typically implemented using a random access storage device, such as a ROM or RAM. Each pixel in strip 402 is represented by one word of memory in this storage device. The contents of this memory are determined, according to a procedure detailed below, before the screening process is initiated. FIG. 5 shows the m points in XY space corresponding to the m pixels in the strip 402. The XY coordinate system is the one used by raster output device 112. Thus, it is also referred to as 'device coordinate space.' The points 502, 504, and 506 are given the XY coordinates (0,0), (1,0), and (m-1,0), respectively.

Figure 6:
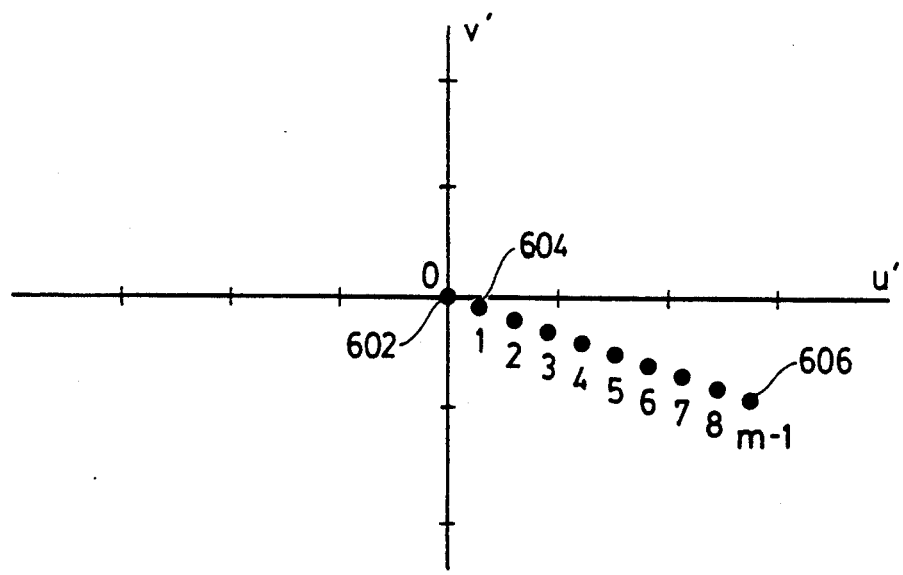
FIG. 6 shows the sequence of points (0,0) through (m-1,0) transformed into U'V' space used to calculate the error function in accordance with the present invention.

FIG. 6 shows the points of FIG. 5 transformed into U'V' coordinate space. The transformation consists of a scaling operation and a rotation operation. Point 602 is the XY point (0,0) transformed into U'V' space, point 604 is the XY point (1,0) transformed into U'V' space, and point 606 is the XY point (m-1,0) transformed into U'V' space. The U'V' coordinates of a point are determined mathematically from the XY coordinates according to the following equations:

$$u' = \frac{ruling}{resolution} * (x * \cos\theta - y * \sin\theta) \quad (1)$$

$$v' = \frac{ruling}{resolution} * (x * \sin\theta + y * \cos\theta)$$

where resolution is the spatial resolution of raster output device 112, ruling is the desired screen ruling, and theta is the desired screen angle.

Figure 7:
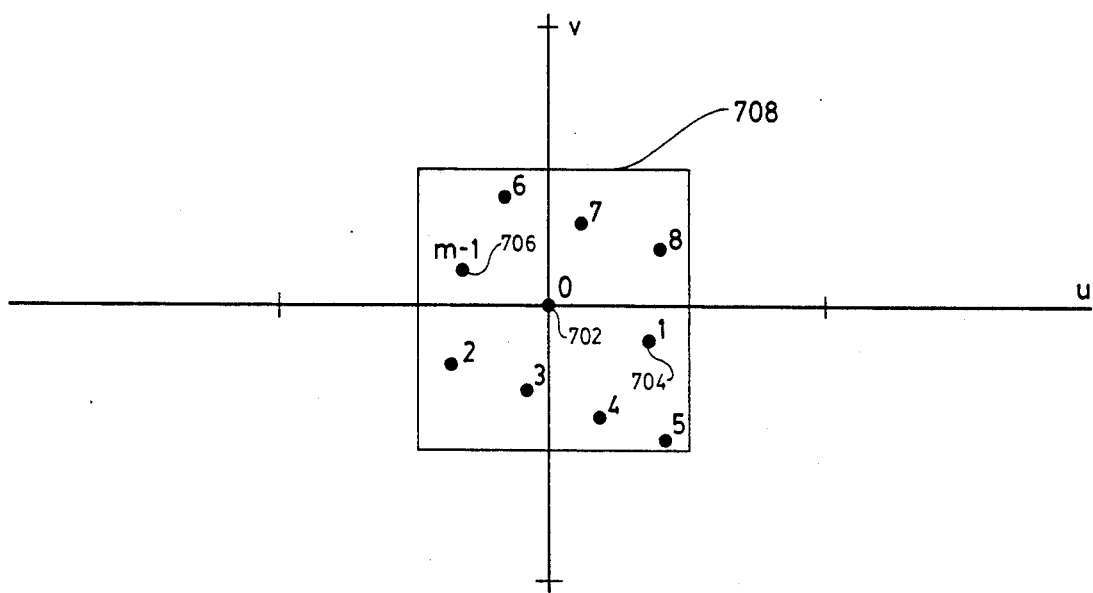
FIG. 7 shows the sequence of points (0,0) through (m-1,0) transformed into UV space used to calculate the error function in accordance with the present invention.

After transformation into U'V' space, points 602, 604 ... 606 are again transformed into UV space. The result of this transform is shown in FIG. 7, where the points 702, 704 ... 706 are the transformed counterparts of points 602, 604 ... 606, respectively. This transformation, which amounts to a "wrapping around of the edges" of the square 708 bounded by the UV coordinates $(-.5,-.5)$ and $(.5,.5)$, is described mathematically by the equations:

$$u = u' - \text{round}(u') \quad (2)$$

$$v = v' - \text{round}(v')$$

where, for any real x, round(x) is the integer nearest x.

One important property of this transformation into UV space is that two distant points in XY space may be transformed into two points in very close proximity in UV space. Then, the values of the strip 402 pixels may be determined by applying the spot function to the UV coordinates. One such useful spot function is given by $$\frac{2 + \cos(2 * pi * u) + \cos(2 * pi * v)}{4} \quad (3)$$

The above spot function produces a peak at the center of square 708, and a minimum value at the corners of square 708. One skilled in the art will recognize that many other spot functions may be used with the present invention. Different spot functions will result in differently shaped dots in screened halftone 110. In short, the value of a pixel 408 in strip 402 is determined by transforming its corresponding XY coordinate into U'V' space, then further transforming this point into UV space, and finally applying the spot function to the coordinates of this point. It is possible at this point to perform further processing before using strip 402 in accordance with the present invention to generate a halftone screen. One example is to replace the gray scale values in strip 402 with a uniform distribution of gray values that are still in the same order.

1. Choosing a starting pixel address at the beginning of a scan line

At the beginning of each scan line, a pixel address of strip 402 is chosen, in such a way as to minimize the resulting error. This pixel address is used to generate the first pixel of the scan line in screen pattern 106. More specifically, for the first pixel of scan line y, an address k is chosen so as to minimize the magnitude of the error vector obtained from transforming the XY vector $(0,y)-(k,0)$ into UV space. The value of k must be in the range of 0 through m-n-1, so that scan line 404 is included within the offset strip 402. The value of m (length of strip 402) is typically twice the value of n (length of scan line 404), so that m-n is typically equal to n.

For the first scan line, this value of k is zero, and the error is similarly zero. For other scan lines, some technique is needed to determine this value of k. One technique for determining this value of k is to search through all values of k, in the range of 0 through m-n-1, directly calculate the error vector for each of these values of k, and choose the value of k that resulted in the error vector with the least magnitude. Although this technique is practical, it requires more computation than necessary.

An alternative method, which is the best known for practice with the present invention, makes use of a number of tables to reduce the number of values of k that must be searched. It also makes use of the eu and ev storage registers to represent the u and v coordinates, respectively, of the error vector. Each of the tables contains nt values. Experiment has determined that a value of 16 for nt is sufficient.

The table jt[i] contains the nt values of j, ranging from -(m-n-1) to m-n-1, such that the magnitudes of the vectors obtained from transforming the XY vectors $(0,1)-(j,0)$ into UV space are the nt least such magnitudes. The order of the values in jt[i] is immaterial. Further, the tables ut[i] and vt[i] contain the u and v coordinates, respectively, of the point obtained from transforming the XY point $(0,1)-(jt[i],0)$ into UV space. Assuming that the starting address of the previous scan line was ky, and the error vector was (eu,ev), the new value of k is determined to be ky +jt[i], where i meets the following conditions:

(1) The value of i is in the range of 0 through nt-1.

(2) The value of ky+jt[i] is in the range of 0 through m-n-1.

(3) The magnitude of the new error vector (eu+ut[i], ev+vt[i]) is the smallest such magnitude that meets conditions (1) and (2).

After the new value of k is chosen, the eu and ev storage registers are updated to hold eu +ut[i] and ev +vt[i], respectively.

2. Screens with Rational Tangent Angles and Irrational Ruling

The present invention, as described so far, relies on an even coverage of UV space by pixels in strip 402, as shown in FIG. 7. Even coverage is ensured by the use of irrational tangent screen angles, in particular the 15 degree and 75 degree angles used in color printing. However, even coverage of UV space is not obtained when using rational tangent screen angles, such as the 45 degree and 0 degree angles used in color printing. Rather, strip 402 encodes values that lie on a single line in UV space, for a 0 degree angle or a 45 degree angle, or more for other rational tangent angles. The preferred solution is to use a plurality of strips 402, each corresponding to a different line (or group of lines) in UV space. The above-described method is then modified so that a choice is made of both strip and starting address for each scan line. This decision is made in such a way as to minimize the error vector arising from the transforming the difference of the two XY points (k,l) and (0,y) into UV space, where k is the starting address within the strip, l is the strip number, and y is the scan line number.

The number of strips, ns, is chosen so that the point obtained from transforming the XY point (O,ns) into UV space comes nearer to the point (0,0) than for any smaller value of ns. Typically, ns will be approximately equal to the ratio of the resolution and the screen ruling. Better results can be obtained by the use of larger values of ns. The value of the pixel numbered k in the strip numbered l can be determined by transforming the XY point (k,l) into UV space, then applying the spot function to the resulting coordinates.

The rational tangent screens of the present invention should be distinguished from those of other techniques, such as that described in Holladay (4,149,194). In the present invention, screen patterns with any screen ruling can be generated with precision. In the prior art rational tangent techniques, rulings are restricted to values resolution / sqrt(i 2+j 2), where the tangent of the angle is i/j, for integer values of i and j.

Generating rational angled screens by the foregoing method results in a relatively high memory requirement, typically on the order of hundreds of thousands of words. An alternative is to use conventional rational angled screens for the 0 and 45 degree cases. Then, the 15 and 75 degree screens are made to match the screen ruling of the 45 degree screen. Further, the problem could be avoided altogether by rotating all screens by the same irrational angle, such as 7.5 degrees. In this case, the screen angles are 22.5 for cyan, 82.5 for magenta, 7.5 for yellow, and 52.5 for black. All angles are irrational and can therefore be implemented with modest memory requirements.

Figure 8:
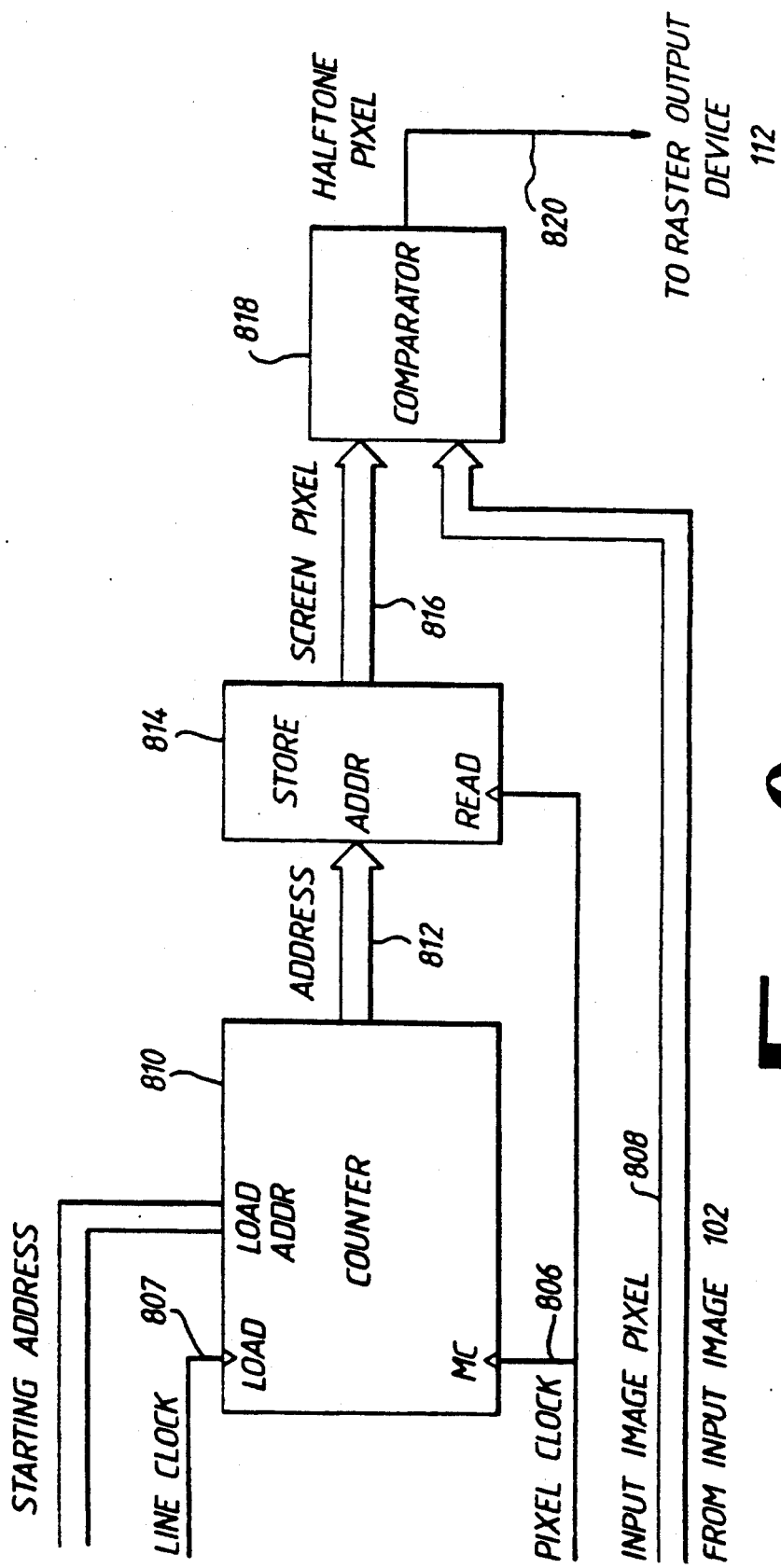
FIG. 8 is a block diagram of a hardware embodiment for screening an input image in accordance with the present invention.
Figure 9:
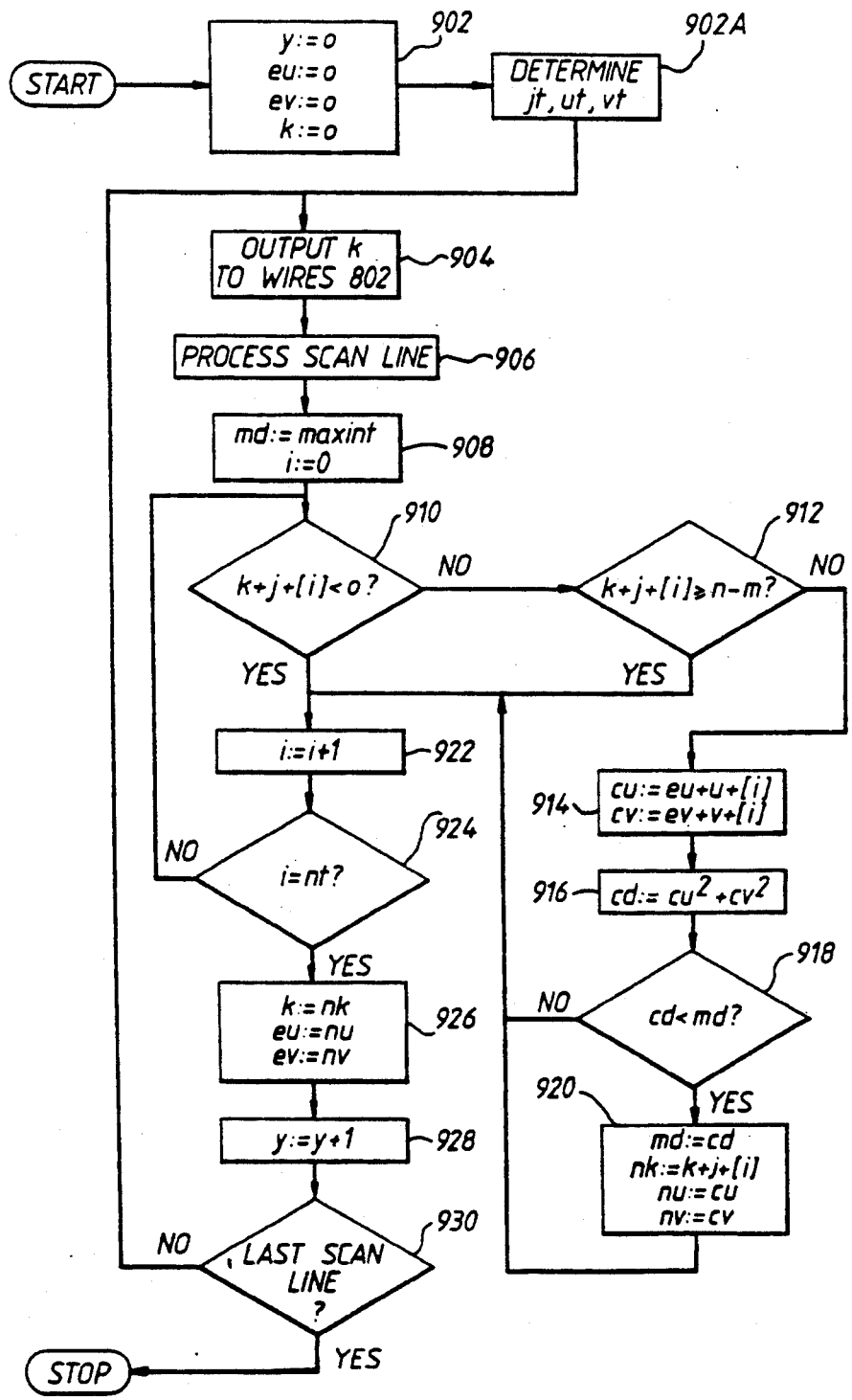
FIG. 9 shows a flowchart for sequencing through the selection of successive scan line segments in a preferred embodiment of the present invention.

The preferred embodiment of the present invention is as an image processing system comprising in part a software program running on a digital computer for certain decision functions, and a simple hardware circuit to carry out certain other high speed screening functions. FIG. 8 shows a block diagram of the hardware portion for high speed screening functions. FIG. 9 shows a flowchart for a software program to be used in conjunction with the hardware device of FIG. 8, in implementing the present invention. The computational burden of the software program is very small, allowing the use of a very inexpensive computer to carry out the steps of FIG. 9, such as an 8-bit microcontroller. The hardware circuit is also extremely simple, allowing a high-performance screener to be constructed very economically. The high performance drum recorders of today require halftone pixels to be supplied at a rate of 15 MHz. In the near future, drum recorders are expected to require a rate of 30 MHz. The hardware circuit of FIG. 8 can easily be constructed to operate at rates from 10 to 50 MHz.

In step 902, the top scan line is designated as line zero, the error vector values of eu and ev are initialized to zero, and the starting address k into strip 402 is initialized to zero. Initial values for jt, ut, and vt are determined at step 902A according to the description in section 1, herein. In step 904, the value of starting address k is output to starting address wires 802. Then, in step 906, a scan line is processed. FIG. 8 shows a schematic diagram of a circuit which processes a scan line. This schematic diagram represents the processing which is to be performed in step 906.

To begin processing of a scan line, line clock wire 804 is strobed, loading the value of variable k from starting address bus 802 into address counter 810. The value of address counter 810 is placed on address wires 812. Address wires 812 select a pixel from store 814, which contains the screen samples of strip 402. Store 814 is preferably implemented by a ROM device containing pre-calculated strip pixel values, or, alternatively, a RAM device containing strip pixel values that have been calculated in response to screen ruling and angle inputs prior to screening the input image.

An input image pixel value from original input image 102 is placed on data bus 808, and pixel clock wire 806 is strobed. Pixel clock wire 806 causes the screen pixel corresponding to the value of address data bus 812 to be read from store 814 and placed on the screen pixel data bus 816. Thus, screen pixel data bus 816 contains the desired screen pixel from strip 402. Comparator 818 compares the screen pixel value on data bus 816 to the input image pixel value on data bus 808, and the result of the comparison is placed on halftone image wire 820. Thus, halftone image wire 820 contains a single pixel of screened halftone 110. Wire 820 preferably carries the halftone pixel to raster output device 112, where raster output device 112 either marks or does not mark a suitable image carrier, in response to the value on halftone image wire 820.

Pixel clock wire 806 also causes address counter 810 to increment its value. New image pixels are successively placed on image pixel data bus 808 each time the pixel clock wire 806 is strobed in synchronization, until the end of the scan line is reached. On each strobe of pixel clock 806, the address on data bus 812 is thus one greater than the address on data bus 812 corresponding to the previous pixel clock 806 strobe. In this way, the screen pixel values on data bus 816 are selected from the sequence of pixels in strip 402, offset by the starting address 802.

When the processing of the scan line has been completed, processing continues with step 908, which initializes index i to zero, and initializes previous least squared magnitude md to the largest possible integer that can be represented.

In step 910, candidate pixel address k+jt[i] is tested to determine if it is negative. If so, it is rejected immediately by skipping to step 922. The table jt[i] is determined in step 902A. In step 912 candidate pixel address k+jt[i] is similarly tested to determine if it is greater than or equal to the number of pixels in strip 402 minus the number of pixels in a scan line, m-n. If so, it is rejected by skipping to step 922.

If the candidate pixel passed the tests of steps 910 and 912, then the resulting error is determined in step 914 by setting candidate error values cu and cv to previous error values eu and ev plus table values ut[i] and vt[i], respectively. Tables ut[i] and vt[i] are determined in step 902A. In step 916, the square of the magnitude of the candidate error vector (cu,cv) is determined, and assigned to the variable cd. Then, in step 918, this squared magnitude cd is compared with previous least squared magnitude md. If cd is less, then md is assigned the value of cd in step 920. In addition, new pixel address nk receives the candidate pixel address ky+jt[i], and new error variables nu and nv receive candidate error values cu and cv, respectively. In either case, processing continues with step 922, in which the index variable i is incremented.

In step 924, index variable i is tested to determine whether all table entries have been exhausted. If not, then processing continues at step 910, and the process of steps 910 through 924 repeats until the table entries have been exhausted after which, k is assigned new pixel address nk, and error variables eu and ev are assigned new error values nu and nv, respectively in step 926. Then, in step 928, pixel coordinate y is incremented, and tested in step 930 to determine whether all scan lines have been processed. If not, processing continues at step 904, and the process repeats until all scan lines have been processed.

What is claimed is:

1. A method for generating a halftone screened image from an halftone screen original image, said method comprising:
    storing an oversized strip, said oversized strip representing a portion of an ideal angled screen pattern having a width greater than the width of said original image;

selecting scan line segments of said oversized strip, the length of each of said selected scan line segments being substantially equal to said width of said original image;

assembling said selected scan line segments of said oversized strip in a sequence of scan lines forming a generated screen pattern; and screening said original image with said generated screen pattern to form said halftone screened image.

2. A method in accordance with claim 1, where said step of screening said original image with said generated screen pattern to form said halftone screened image comprises:

comparing said generated screen pattern with said original image; and generating a marking signal for a marking device based on said comparison between said generated screen pattern and said original image.

3. A method in accordance with claim 1, wherein said step of selecting scan line segments of said oversized strip comprises:

selecting an offset corresponding to a selected pixel of said oversized strip, said selected scan line segment beginning at said selected offset and ending at said selected offset plus the width of said halftone screened image.

4. A method in accordance with claim 1, where said step of selecting scan line segments of said oversized strip further comprises:

computing an error function based on the difference between the generated screen pattern and an ideal desired screen pattern; and selecting a scan line segment of said oversized strip from a plurality of scan line segments so that said error function of said selected scan line segment combined with the error function of said previous selected scan line segment produces the least combined error.

5. A method in accordance with claim 4, wherein said step of computing an error function based on the error between the actual generated screen pattern and an ideal desired screen pattern comprises:

calculating an error vector in transformed UV space between the actual screen sample point and the ideal screen sample point.

6. A method in accordance with claim 4, wherein said step of computing an error function based on the error between the actual generated screen pattern and an ideal desired screen pattern comprises:

calculating an error vector between the actual screen sample point and the ideal screen sample point.

7. A method in accordance with claim 6, wherein said step of selecting said scan line segments of said oversized strip comprises:

calculating a plurality of accumulated error vectors by combining said calculated error vector with a calculated error vector corresponding to each of said plurality of scan line segments to form a plurality of accumulated error vectors; and selecting one of said plurality of scan line segments corresponding to the least one of said plurality of accumulated error vectors.

8. A method for generating a screen pattern of a desired screen angle and screen ruling, said method comprising:

storing an oversized strip, said oversized strip representing a portion of an ideal angled screen pattern angled at a said desired screen angle and repeating at a said desired screen ruling, said oversized strip having a width greater than the width of said halftone screened image; selecting scan line segments of said oversized strip, responsive to said desired screen ruling and said desired screen angle, the length of each of said selected scan line segments being substantially equal to said width of said original image; and assembling said selected scan line segments of said oversized strip in a sequence of scan lines forming a generated screen pattern.

9. A method in accordance with claim 8, wherein said step of selecting scan line segments of said oversized strip comprises:

selecting an offset corresponding to a selected pixel of said oversized strip, said selected scan line segment beginning at said selected offset and ending at said selected offset plus the width of said halftone screened image.

10. A method in accordance with claim 8, where said step of selecting scan line segments of said oversized strip further comprises:

computing an error function based on the difference between the generated screen pattern and an ideal desired screen pattern; and selecting a scan line segment of said oversized strip from a plurality of scan line segments so that said error function of said selected scan line segment combined with the error function of said previous selected scan line segment produces the least combined error.

11. A method in accordance with claim 10, wherein said step of computing an error function based on the error between the actual generated screen pattern and an ideal desired screen comprises:

calculating an error vector between the actual screen sample point and the ideal screen sample point.

12. A method in accordance with claim 11, wherein said step of selecting said scan line segments of said oversized strip comprises:

calculating a plurality of accumulated error vectors by combining said calculated error vector with a calculated error vector corresponding to each of said plurality of scan line segments to form a plurality of accumulated error vectors; and selecting one of said plurality of scan line segments corresponding to the least one of said plurality of accumulated error vectors.

13. A method in accordance with claim 10, wherein said step of computing an error function based on the error between the actual generated screen pattern and an ideal desired screen pattern comprises:

calculating an error vector in transformed UV space between the actual screen sample point and the ideal screen sample point.

14. An apparatus for generating a halftone screened image from an original image, comprising:

means for storing an oversized strip, said oversized strip representing a portion of an ideal angled screen pattern having a width greater than the width of said halftone screened image;

means for selecting scan line segments of said oversized strip, the length of each of said selected scan line segments being substantially equal to said width of said original image;

means for assembling said selected scan line segments of said oversized strip in a sequence of scan lines forming a generated screen pattern; and means for screening said original image with said generated screen pattern to form said halftone screened image.

15. An apparatus in accordance with claim 14, where said means for screening said original image with said generated screen pattern to form said halftone screened image comprises:

means for comparing said generated screen pattern with said original image; and means for generating a marking signal for a marking device based on said comparison between said generated screen pattern and said original image.

16. An apparatus in accordance with claim 14, wherein said means for selecting scan line segments of said oversized strip comprises:

means for selecting an offset corresponding to a selected pixel of said oversized strip, said selected scan line segment beginning at said selected offset and ending at said selected offset plus the width of said halftone screened original image.

17. An apparatus in accordance with claim 14, where said means for selecting scan line segments of said oversized strip further comprises:

means for computing an error function based on the difference between the generated screen pattern and an ideal desired screen pattern; and means for selecting a scan line segment of said oversized strip from a plurality of scan line segments so that said error function of said selected scan line segment combined with the error function of said previous selected scan line segment produces the least combined error.

18. An apparatus in accordance with claim 17, wherein said means for computing an error function based on the error between the actual generated screen pattern and an ideal desired screen pattern comprises:

means for calculating an error vector between the actual screen sample point and the ideal screen sample point.

19. An apparatus in accordance with claim 18, wherein said means for selecting said scan line segments of said oversized strip comprises:

means for calculating a plurality of accumulated error vectors by combining said calculated error vector with a calculated error vector corresponding to each of said plurality of scan line segments to form a plurality of accumulated error vectors; and means for selecting one of said plurality of scan line segments corresponding to the least one of said plurality of accumulated error vectors.

20. An apparatus in accordance with claim 17, wherein said means for computing an error function based on the error between the actual generated screen pattern and an ideal desired screen pattern comprises:

means for calculating an error vector in transformed UV space between the actual screen sample point and the ideal screen sample point.

21. An apparatus for generating a screen pattern of a desired screen angle and screen ruling, comprising:

means for storing an oversized strip, said oversized strip representing a portion of an ideal angled screen pattern angled at a said desired screen angle and repeating at said desired screen ruling, said oversized strip having width greater than the width of said halftone screened image;

means for selecting scan line segments of said oversized strip, responsive to said desired screen ruling and said desired screen angle, the length of each of said selected scan line segments being substantially equal to said width of said original image; and means for assembling said selected scan line segments of said oversized strip in a sequence of scan lines forming a generated screen pattern.

22. An apparatus in accordance with claim 21, wherein said means for selecting scan line segments of said oversized strip comprises:

means for selecting an offset corresponding to a selected pixel of said oversized strip, said selected scan line segment beginning at said selected offset and ending at said selected offset plus the width of said halftone screened image.

23. An apparatus in accordance with claim 21, where said means for selecting scan line segments of said oversized strip further comprises:

means for computing an error function based on the difference between the generated screen pattern and an ideal desired screen pattern; and means for selecting a scan line segment of said oversized strip from a plurality of scan line segments so that said error function of said selected scan line segment combined with the error function of said previous selected scan line segment produces the least combined error.

24. An apparatus in accordance with claim 23, wherein said means for computing an error function based on the error between the actual generated screen pattern and an ideal desired screen pattern comprises:

means for calculating an error vector in transformed UV space between the actual screen sample point and the ideal screen sample point.

25. An apparatus in accordance with claim 23, wherein said means for computing an error function based on the error between the actual generated screen pattern and an ideal desired screen pattern comprises:

means for calculating an error vector between the actual screen sample point and the ideal screen sample point.

26. An apparatus in accordance with claim 25, wherein said means for selecting said scan line segments of said oversized strip comprises:

means for calculating a plurality of accumulated error vectors by combining said calculated error vector with a calculated error vector corresponding to each of said plurality of scan line segments to form a plurality of accumulated error vectors; and means for selecting one of said plurality of scan line segments corresponding to the least one of said plurality of accumulated error vectors.

* * * * *